(12) United States Patent
Mishima et al.

(10) Patent No.: US 7,952,984 B2
(45) Date of Patent: May 31, 2011

(54) OPTICAL RECORDING MEDIUM AND METHOD OF RECORDING AND REPRODUCING OF OPTICAL RECORDING MEDIUM

(75) Inventors: Koji Mishima, Tokyo (JP); Kenji Yamaga, Tokyo (JP); Daisuke Yoshitoku, Tokyo (JP)

(73) Assignee: TDK Corporation, Tokyo (JP)

( * ) Notice: Subject to any disclaimer, the term of this patent is extended or adjusted under 35 U.S.C. 154(b) by 1582 days.

(21) Appl. No.: 11/111,912

(22) Filed: Apr. 22, 2005

(65) Prior Publication Data

US 2005/0237894 A1    Oct. 27, 2005

Related U.S. Application Data

(60) Provisional application No. 60/564,229, filed on Apr. 22, 2004.

(51) Int. Cl.
*G11B 7/24* (2006.01)

(52) U.S. Cl. ............... 369/275.3; 369/94; 369/275.1; 369/283; 369/275.4

(58) Field of Classification Search .......... 369/94, 369/275.1, 275.3, 283, 275.4; 430/270.1, 430/270.13
See application file for complete search history.

(56) References Cited

U.S. PATENT DOCUMENTS

| | | | | |
|---|---|---|---|---|
| 5,635,267 A * | 6/1997 | Yamada et al. | ............... | 428/64.4 |
| 6,251,561 B1 * | 6/2001 | Kawai et al. | ............ | 430/270.11 |
| 6,806,030 B2 * | 10/2004 | Terao et al. | ............... | 430/270.13 |
| 7,154,836 B2 * | 12/2006 | Inoue et al. | ................... | 369/100 |
| 7,238,461 B2 * | 7/2007 | Akiba et al. | ............. | 430/270.18 |
| 2002/0006684 A1 * | 1/2002 | Terao et al. | ................... | 438/102 |

FOREIGN PATENT DOCUMENTS

| | | | |
|---|---|---|---|
| EP | 353394 A2 | * | 2/1990 |
| EP | 0353394 | * | 7/1990 |
| JP | A 58-158036 | | 9/1983 |
| JP | A 58-203093 | | 11/1983 |
| JP | A 58-203094 | | 11/1983 |
| JP | A 59-185048 | | 10/1984 |
| JP | A 60-020335 | | 2/1985 |
| JP | B2 03-057540 | | 9/1991 |
| JP | A 04-112084 | | 4/1992 |
| JP | B2 2710040 | | 10/1997 |
| JP | A 10-334507 | | 12/1998 |
| JP | A 2003-048375 | | 2/2003 |
| JP | A 2003-237242 | | 8/2003 |
| WO | WO 03/101750 A1 | | 12/2003 |

* cited by examiner

*Primary Examiner* — Joseph Haley
*Assistant Examiner* — Ifedayo Iluyomade
(74) *Attorney, Agent, or Firm* — Oliff & Berridge, PLC

(57) ABSTRACT

An optical recording medium and a method of recording and reproducing of the optical recording medium are provided, which are capable of recording and reproducing data with reliability even when blue or blue violet laser light is used as irradiation light. The optical recording medium has a recording layer in which a recording mark composed of a plurality of cavities is formed by irradiation of the laser light. The recording layer is configured so that, in a plan view taken in a direction of irradiation of the laser light, cavities lying in an area of the center and its vicinities of the recording mark, out of the plurality of cavities, include cavities greater than ones lying around the area.

10 Claims, 8 Drawing Sheets

OPTICAL RECORDING MEDIUM AND METHOD OF RECORDING AND REPRODUCING OF OPTICAL RECORDING MEDIUM

This non-provisional application claims the benefit of U.S. Provisional Application No. 60/564,229, filed Apr. 22, 2004.

BACKGROUND OF THE INVENTION

1. Field of the Invention

The invention relates to an optical recording medium having a recording layer which makes an optical change for data recording when irradiated with laser light, and a method of recording and reproducing of the optical recording medium.

2. Description of the Related Art

Optical recording media such as a compact disc (CD) and a digital versatile disc (DVD) are widely used as information recording media. In recent years, attention is being given to optical recording media which use blue or blue violet laser light as irradiation light so that a large amount of information can be recorded at still higher densities. For the sake of specification standardization, blue violet laser light having a wavelength of approximately 405 nm has been proposed for use, and compatible optical recording media are now becoming prevalent. When the blue or blue violet laser light is used as the irradiation light, tracks on an optical recording medium are formed at track pitches within the range of 0.1 to 0.5 μm. Incidentally, a plurality of recording layers maybe formed with a transparent spacer layer(s) therebetween. This multilayer recording type allows a further increase in the recording capacity.

Optical recording media are broadly classified into a ROM (Read Only Memory) type in which data cannot be added or rewritten, an R (Recordable) type in which data can be added only once, and an RW (Rewritable) type in which data can be rewritten. The recording layer of R-type optical recording medium needs to make changes in optical characteristics when irradiated with laser light. Besides, it is essential that the recording layers be unsusceptible to deterioration even after a long period of storage, having excellent durability. Conventionally, organic dye has thus been used widely as a material of the recording layers of the R-type optical recording media. This conventional organic dye is a substance less likely to absorb ultraviolet rays and short-wave visible rays, such as blue and blue violet, which are prone to promote chemical reactions. It is this feature of the conventional organic dye that has contributed suppressed deterioration.

Since the conventional organic dye is less likely to absorb short-wave visible rays of blue and blue violet, however, it has been impossible to obtain satisfactory change in optical characteristics for data recording when the blue or blue violet laser light is used as the irradiation light. Moreover, it has been difficult to develop an organic dye which provides satisfactory change in optical characteristics even for situations where the blue or blue violet laser light is used as the irradiation light, and is unsusceptible to deterioration for a long period of storage.

In view of the foregoing, R-type optical recording media that have recording layers made of inorganic material containing Bi and O have been disclosed, for example, in Japanese Patent Laid-Open Publications Nos. 2003-48375 and Hei 10-334507.

Nevertheless, even the inorganic material containing Bi and O has sometimes failed to achieve desired change in optical characteristics when the blue or blue violet laser light is used as the irradiation light.

Besides, such an inorganic material containing Bi and O can vary in reflectance and in light transmittance as well, when irradiated with laser light. Consequently, if the inorganic material containing Bi and O is used to make the recording layers of an optical recording medium of multilayer recording type, the laser light to reach the lower(on the substrate side) recording layer varies in intensity between where the upper (on the cover-layer side) recording layer has been irradiated with the laser light to form recording marks and where not. There has thus been the problem that the accuracy of recording of data on the lower recording layer and the accuracy of reproduction of data from the lower recording layer are low.

SUMMARY OF THE INVENTION

In view of the foregoing problems, various exemplary embodiments of this invention provide an optical recording medium and a method of recording and reproducing of the optical recording medium which are capable of recording and reproducing data with reliability even when blue or blue violet laser light is used as the irradiation light.

According to one of the exemplary embodiments of the present invention, an optical recording medium comprises a recording layer which is configured so that a recording mark composed of a plurality of cavities is formed by irradiation of laser light. This allows reliable data recording and reproduction even when blue or blue violet laser light is used as the irradiation light.

The conventional inorganic material containing Bi and O is chiefly composed of $Bi_2O_3$, and thus the ratio of the number of atoms of O to the total number of atoms of Bi and O is approximately 60%. Meanwhile, in the process of achieving the present invention, the inventors have made various recording layers containing Bi and O in different composition ratios, and examined them for optical characteristics. From the examination, it has been found that the ratio of the number of atoms of O to the total number of atoms of Bi and O can be set at or above 63% to record and reproduce data with reliability. The reason for this is an increase in the difference between the reflectance of areas where recording marks are formed by the irradiation of blue or blue violet laser light (having a wavelength of the order of 380 to 450 nm) and the reflectance of space areas where no recording mark is formed. Incidentally, in this case, the recording layers seem to contain unstable compounds such as $Bi_2O_5$ and $Bi_2O_4$.

The inventors have also found that the ratio of the number of atoms of O to the total number of atoms of Bi and O can be set at or above 63% with a significant increase in light transmittance. Besides, the difference between the light transmittance of the areas where recording marks are formed and the light transmittance of the space areas where no recording mark is formed becomes smaller. This material is thus suited for the recording layers of an optical recording medium of multilayer recording type. The space areas have the light transmittance equivalent to that of unrecorded areas. That is, the difference between the light transmittance of a recording layer that has been irradiated with laser light to form recording marks and spaces, and the light transmittance of an unrecorded recording layer yet to be irradiated with laser light is small. Then, the recording layer on the substrate side can be irradiated with laser light of constant intensity irrespective of the presence or absence of data recorded on the recording layer on the cover-layer side. It is therefore possible to record data on the substrate-side recording layer with reliability, and to reproduce data recorded on the substrate-side recording layer with reliability.

The inventors have made intensive studies on the reason for these effects and found the following. In the recording layers where the ratio of the number of atoms of O to the total number of atoms of the inorganic materials, or Bi and O, reaches or exceeds 63%, each single recording mark formed by the irradiation of the blue or blue violet laser light is composed of a plurality of cavities. That is, it is found that in the conventional recording layers made of the organic dye or inorganic material, each recording mark is made of a single protrusion or an undeformed marking of a changed optical characteristic. In contrast, the recording layers described above are provided with recording marks of totally different structure.

When such recording marks composed of a plurality of cavities are irradiated with laser light for reproduction, the laser light is diffused and refracted by the plurality of cavities. As a result, the amount of light incident on a photodetector decreases accordingly, which seems to be detected as a drop in reflectance.

Moreover, it is considered that oxygen gas occurs from decomposition of $Bi_2O_5$ or $Bi_2O_4$ and it inflates the surrounding bismuth oxides to form the cavities in the recording marks. Since the cavities themselves cause no light absorption, they seem to have a relatively high light transmittance. While the cavities themselves have a high light transmittance, the vicinities of the interfaces of the cavities can cause diffraction and refraction with a drop in light transmittance by that much. In addition, the formed cavities thicken the recording marks other than where the cavities are. This increases the light absorptance accordingly, with a drop in light transmittance. This effect of the cavities themselves to increase the light transmittance is cancelled out by the effect of decreasing the light transmittance due to the diffraction and refraction near the interfaces of the cavities and the effect of decreasing the light transmittance at portions other than the cavities. This seems to be the reason why the entire recording marks apparently drop in reflectance as compared to the space areas, while the difference to the light transmittance of the space areas is suppressed smaller.

Furthermore, in various exemplary embodiments of the invention, the recording mark is formed so that the cavities lying near the periphery are smaller than the cavities lying in the areas of the centers and their vicinities. This suppresses a deformation of the peripheral portions of the recording marks to improve recording/reproducing accuracies.

Alternatively, in other various exemplary embodiments of the invention, the recording mark is formed so that the cavities formed in the areas near the peripheries are spaced narrower than those formed in the inner areas are. The peripheries of the recording mark is thus formed accordingly finely, which also improves the recording and reproducing accuracies.

Accordingly, various exemplary embodiments of the invention provide an optical recording medium comprising:

a substrate; and a recording layer in which a recording mark composed of a plurality of cavities is formed by irradiation of laser light, the recording layer being formed on the substrate, the recording layer is configured so that, in a plan view taken in a direction of irradiation of the laser light, cavities lying in an area of the center and its vicinities of the recording mark, out of the plurality of cavities, include cavities greater than ones lying around the area.

Alternatively, various exemplary embodiments of the invention provide an optical recording medium comprising:

a substrate; and a recording layer in which a recording mark composed of a plurality of cavities is formed by irradiation of laser light, the recording layer being formed on the substrate, the recording layer is configured so that, in a plan view taken in a direction of irradiation of the laser light, cavities lying in a peripheral area are spaced narrower than cavities lying in an area of the center and its vicinities of the recording mark are.

Alternatively, various exemplary embodiments of the invention provide an optical recording medium comprising:

a substrate; and a recording layer in which a recording mark composed of a plurality of cavities is formed by irradiation of laser light, the recording layer being formed on the substrate, the recording layer is configured so that, in a plan view taken in a direction of irradiation of the laser light, the total area of the plurality of cavities in the recording mark falls within the range of 20% and 90% with respect to the area of the recording mark.

Various exemplary embodiments of the invention provide a method of recording and reproducing of an optical recording medium, comprising:

a recording step of irradiating an optical recording medium with laser light for recording so that a recording mark composed of a plurality of cavities is formed in a recording layer of the optical recording medium; and a reproducing step of irradiating the optical recording medium with laser light for reproduction so that information is reproduced based on a difference between a reflectance of an area of the recording mark and a reflectance of a space area around the recording mark, in the recording step, the recording mark is formed so that, in a plan view taken in a direction of irradiation of the laser light, cavities lying in an area of the center and its vicinities of the recording mark, out of the plurality of cavities, include cavities greater than ones lying around the area.

Alternatively, various exemplary embodiments of the invention provide a method of recording and reproducing of an optical recording medium, comprising:

a recording step of irradiating an optical recording medium with laser light for recording so that a recording mark composed of a plurality of cavities is formed in a recording layer of the optical recording medium; and a reproducing step of irradiating the optical recording medium with laser light for reproduction so that information is reproduced based on a difference between a reflectance of an area of the recording mark and a reflectance of a space area around the recording mark, in the recording step, the recording mark is formed so that, in a plan view taken in a direction of irradiation of the laser light, the cavities lying in a peripheral area of the recording mark are spaced narrower than the cavities lying in an area of the center and its vicinities of the recording mark are.

As employed herein, the phase "a recording layer is substantially made of Bi and O" shall mean that the total number of atoms of Bi and O in the recording layer reaches or exceeds 80% with respect to the number of all the atoms constituting the recording layer. Incidentally, it is preferable that the total number of atoms of Bi and O in the recording layer is 90% or higher with respect to the number of all the atoms constituting the recording layer.

Moreover, Bi, O, and M in expressions (I) and (II) to be described later shall represent the numbers of atoms of Bi, O, and M, respectively.

The term "track pitch" shall refer to the pitch between a groove and a next groove in the case of an optical recording medium of groove type in which tracks are made of grooves. The same term shall refer to the pitch between a land and a groove next to this land in the case of an optical recording medium of land and groove type in which tracks are made of lands and grooves.

According to the exemplary embodiments of the present invention, it is possible to record and reproduce data with reliability by using blue or blue violet laser light as the irradiation light. Even with multilayer recording type, data can also be recorded and reproduced with reliability.

DETAILED DESCRIPTION OF THE PREFERRED EMBODIMENTS

Hereinafter, preferred exemplary embodiments of the present invention will be described in detail with reference to the drawings.

Figure 1:
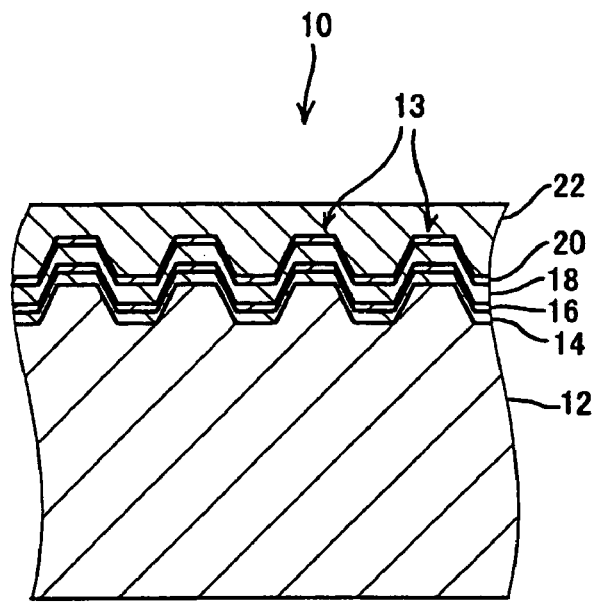
FIG. 1 is a sectional side view schematically showing the configuration of an optical recording medium according to a first exemplary embodiment of the present invention.

As shown in FIG. 1, an optical recording medium 10 according to a first exemplary embodiment of the present invention has a substrate 12 and a reflecting layer 14, a dielectric layer 16, a recording layer 18, a dielectric layer 20, a cover layer 22 which are formed over one side of the substrate 12 in this order. The optical recording medium 10 is an optical disc of R type in which the recording layer 18 varies in optical characteristic when irradiated with laser light, and is characterized by the recording layer 18. The optical recording medium 10 is shaped like a circular disc having an outer diameter of approximately 120 mm and a thickness of approximately 1.2 mm.

The substrate 12 has a thickness of approximately 1.1 mm. Tracks 13 for making recording marks are formed on the surface of the substrate 12 facing to the reflecting layer 14, in the form of grooves at track pitches of 0.1 to 0.5 μm. The term "groove" is typically used as a concave portion of a track. As employed herein, however, the term "groove" shall also refer to a convex portion of a track. In this exemplary embodiment, the grooves are convex portions protruding toward the cover layer 22. The substrate 12 may be made of such materials as polycarbonate resin, acryl resin, epoxy resin, polystyrene resin, polyethylene resin, polypropylene resin, silicone resin, fluorine-based resin, ABS resin, and urethane resin.

The reflecting layer 14, the dielectric layer 16, the recording layer 18, and the dielectric layer 20 are formed in a concavo-convex pattern according to that of the substrate 12.

The reflecting layer 14 may be made of such materials as Al, Ag, Au, Cu, Mg, Ti, Cr, Fe, Co, Ni, Zn, Ge, Ag, and Pt. Of these, Al, Ag, Au, and Cu are preferably used in view of higher reflectances.

The dielectric layers 16 and 20 may be made chiefly of such materials as oxides including $SiO_2$, $Al_2O_3$, ZnO, $CeO_2$, and $Ta_2O_5$, nitrides including SiN, AlN, GeN, and GeCrN, and sulfides including ZnS, and composite materials of these.

Figure 2:
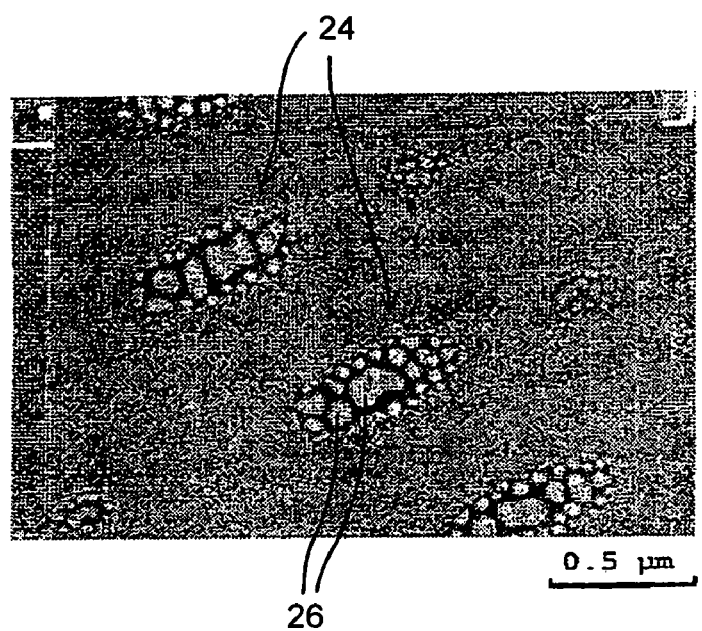
FIG. 2 is a TEM photograph magnifying 2 T and 8 T recording marks on a recording layer of the optical recording medium.

The recording layer 18 is configured so that recording marks 24 each composed of a plurality of cavities 26 are formed by irradiation of laser light as shown in FIG. 2. FIG. 2 is a photograph of recording marks 24 in a plan view taken in the direction of irradiation of the laser light under a transmission electron microscope (TEM). The recording layer 18 is configured so that, in a plan view, the total area of the plurality of cavities 26 in the recording marks 24 falls within the range of 20% to 90% with respect to the area of the recording marks 24. The recording layer 18 is also configured so that, in a plan view, cavities 26 lying in a areas of the centers and their vicinities of the recording marks 24, out of the plurality of cavities 26, include cavities 26 greater than those lying around the areas. In this case, the cavities lying in areas of the centers and their vicinities may also include cavities having similar or smaller sizes than those of the cavities 26 lying around the areas. The recording layer 18 is also configured so that the cavities 26 lying in the peripheral areas are spaced narrower than the cavities 26 lying in the areas of the centers and their vicinities of the recording marks 24 are.

Figure 3:
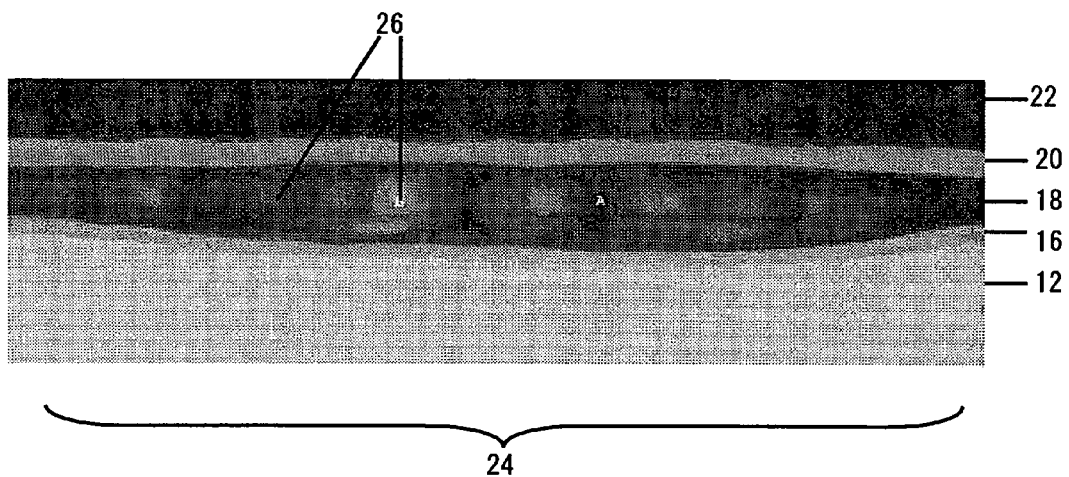
FIG. 3 is a TEM photograph magnifying a sectional side view of the 8 T recording marks.
Figure 4:
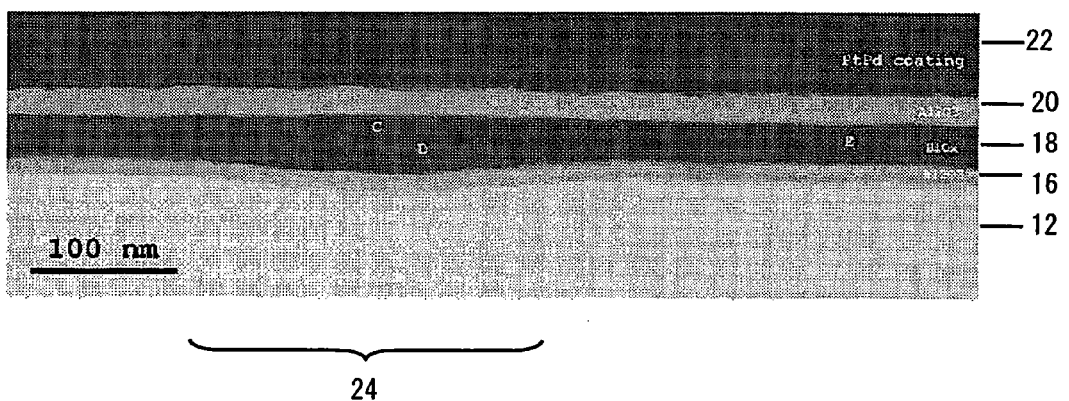
FIG. 4 is a TEM photograph magnifying a sectional side view of the 2 T recording marks.

As shown in FIGS. 3 and 4, the recording layer 18 is also configured so that the cavities 26 are formed as enclosed in the recording layer 18. FIGS. 3 and 4 are TEM photographs showing the recording marks 24 in sections perpendicular to the surface. When the recording marks 24 are formed on the optical recording medium 10, as shown in FIGS. 3 and 4, the recording layer 18 is deformed to protrude chiefly toward the substrate 12 in the direction of thickness. This also deforms the dielectric layer 16, the reflecting layer 14, and the substrate 12. In other words, the cover layer 22 is hardly deformed at all. Incidentally, FIGS. 3 and 4 show recording marks 2 T and 8 T of respective examples to be described later.

The recording layer 18 is substantially made of Bi and O. The ratio of the number of atoms of O to the total number of atoms of Bi and O falls within the range of 63% to 73%.

The cover layer 22 has a thickness of approximately 100 μm. The cover layer 22 may be made of energy ray curable resin such as transparent UV curable acrylic resin and UV curable epoxy resin. Here, the term "energy rays" shall refer collectively to electromagnetic waves and particle beams such as ultraviolet rays and electron rays, which have the property of curing certain fluid resins. Incidentally, the cover layer 22 may be made of a transparent film.

Figure 5:
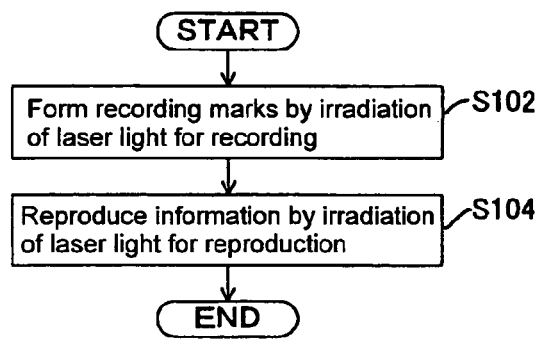
FIG. 5 is a flowchart showing an overview of a method of recording and reproducing of the optical recording medium.

Now, description will be given of the operation of the optical recording medium 10. FIG. 5 is a flowchart showing a method of recording and reproducing of the optical recording medium 10.

The optical recording medium 10 is irradiated with blue or blue violet laser light for recording, whereby recording marks 24 are formed in the areas of the tracks 13 on the recording layer 18 (S102). As seen above in FIG. 2, each of the recording marks 24 is composed of a plurality of cavities 26. The reflectance(to be detected by a photodetector for reproduction) of the areas of the recording marks 24 becomes lower, (i.e., cause a change in optical characteristic) with respect to space areas where no recording mark 24 is formed. Information is recorded by forming a plurality of recording marks 24 and a plurality of space areas on the tracks 13. Incidentally, in a plan view taken in the direction of irradiation of the laser light, the plurality of cavities 26 are formed so that at least some of a plurality of cavities 26 lying in the areas of the centers and their vicinities of the recording marks 24 are greater than cavities 26 lying around the areas. The recording marks 24 are formed so that the cavities 26 lying in the peripheral areas are spaced narrower than the cavities 26 lying in the areas of the center and its vicinities of the recording mark 24 are. Moreover, in the plan view, the plurality of cavities 26 in the recording mark 24 are formed so that their total area falls within the range of 20% to 90% with respect to the area of the recording mark 24. As shown in FIG. 3, the cavities 26 are also formed as enclosed in the recording layer 18. When the recording marks 24 are formed, the peripheral portions of the recording marks 24 are deformed chiefly so as to protrude toward the substrate 12 as shown in FIGS. 3 and 4. Little deformation occurs toward the cover layer 22.

Next, the optical recording medium 10 is irradiated with blue or blue violet laser light for reproduction. Differences between the reflectances of the recording marks 24 and the space areas are detected by the photodetector for reproduction, and the information of the recording marks 24 is reproduced (S104).

Since the recording marks 24 contain a plurality of cavities 26, sufficient amounts of differences occur between the reflectances of the recording marks 24 and the space areas even when the blue or blue violet laser light is used. This allows reliable information recording and reproduction. Moreover, when the recording marks 24 are formed, the cavities 26 are formed inside the recording marks 24. This can suppress deformation of the peripheral portions of the recording marks 24, resulting from the formation of the recording marks 24, to be smaller than in conventional recording layers where each individual recording mark is formed as a single projection. Furthermore, the cavities 26 lying near the periphery are smaller than the cavities 26 lying in the areas of the centers and their vicinities of the recording marks 24. This also suppresses the deformation of the peripheral portions of the recording marks 24 to be smaller. The cavities 26 are formed as enclosed in the recording layer 18. Even in this respect, the deformation of the peripheral portions of the recording marks 24 is suppressed to be smaller. In the optical recording medium 10, the dielectric layers 16 and 20 are formed on both sides of the recording layer 18. Even in this respect, the deformation of the peripheral portions of the recording marks 24 is suppressed to be smaller. Consequently, crosstalk is less likely to occur between adjacent grooves, and the optical recording medium 10 thus improves in the recording and reproducing accuracies accordingly. Incidentally, while the recording layer 18 is deformed in the direction of thickness at portions near the recording marks 24, this deformation is biased toward the substrate 12. Since little deformation occurs toward the cover layer 22, also in this respect the optical recording medium 10 improves in the recording and reproducing accuracies.

Among the plurality of cavities 26, those formed in the areas near the peripheries of the recording marks 24 are smaller. Besides, the cavities 26 formed in the areas near the peripheries of the recording marks 24 are spaced narrower than those formed in the inner areas are. The peripheries of the recording marks 24 are thus formed accordingly finely, which also improves the recording and reproducing accuracies of the optical recording medium 10.

In the optical recording medium 10, the dielectric layer 16 is formed on one side of the recording layer 18, and the dielectric layer 20 on the other side of the same. This makes it difficult for moisture in the substrate 12 and external moisture to reach the recording layer 18, thereby allowing the effect of suppressing the deterioration of the recording layer 18 accordingly.

Figure 6:
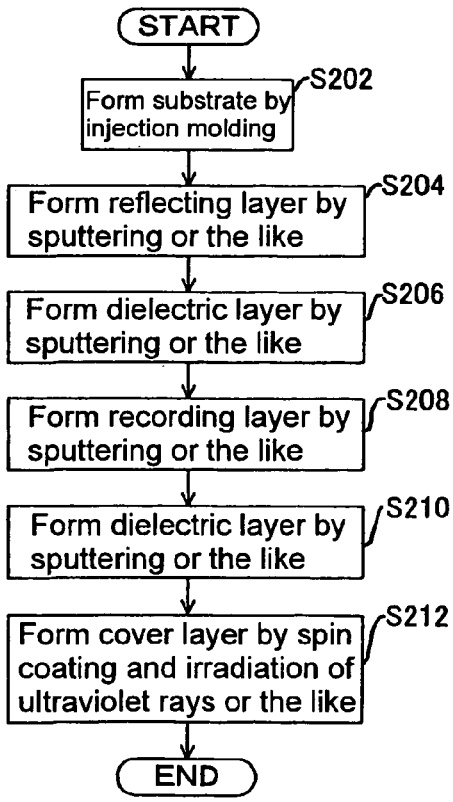
FIG. 6 is a flowchart showing an overview of the steps of manufacturing the optical recording medium.

Next, an example of the method of manufacturing the optical recording medium 10 will be described with reference to the flowchart shown in FIG. 6 and the like.

Initially, a substrate 12 having the shape of a circular disc is formed by injection molding, with an outer diameter of approximately 120 mm and a thickness of approximately 1.1 mm (S202). Here, tracks 13 are formed in a concavo-convex pattern on one side of the substrate 12.

Next, on the side of the substrate 12 where the tracks 13 are formed, a reflecting layer 14 is formed by a vapor phase epitaxial technique such as sputtering and vapor deposition (S204). A dielectric layer 16 is also formed on the reflecting layer 14 by sputtering or the like (S206). The reflecting layer 14 and the dielectric layer 16 are formed in a concavo-convex pattern according to that of the tracks 13.

Next, a recording layer 18 is formed on the dielectric layer 16 by sputtering or the like (S208). To be more specific, the substrate 12 is placed in a chamber (not shown) in which a Bi target is arranged, and $O_2$ gas is supplied into the chamber. Then, sputtering gas such as Ar and Xe is supplied into this chamber so as to impinge the Bi target. This sputters Bi particles, which react with $O_2$ in the chamber and deposit on the dielectric layer 16 of the substrate 12. As a result, the recording layer 18 is formed in an almost uniform thickness along the concavo-convex pattern of the tracks 13. The sputtering conditions can be adjusted to control the ratio of Bi and O in the recording layer 18. Incidentally, while it is preferable that the recording layer 18 be chiefly composed of Bi and O, some small amounts of other elements and compounds may be mixed in.

Next, a dielectric layer 20 is formed on the recording layer 18 by sputtering, vapor deposition, or the like (S210). The dielectric layer 20 is also formed in a concavo-convex pattern according to that of the tracks 13.

Finally, a cover layer 22 is spread over the dielectric layer 20 to a thickness of 100 μm by spin coating, and irradiated with ultraviolet rays or the like for curing (S212). Here, a prefabricated film may be bonded to form the cover layer 22. The optical recording medium 10 is thus completed.

Now, description will be given of a second exemplary embodiment of the present invention.

Figure 7:
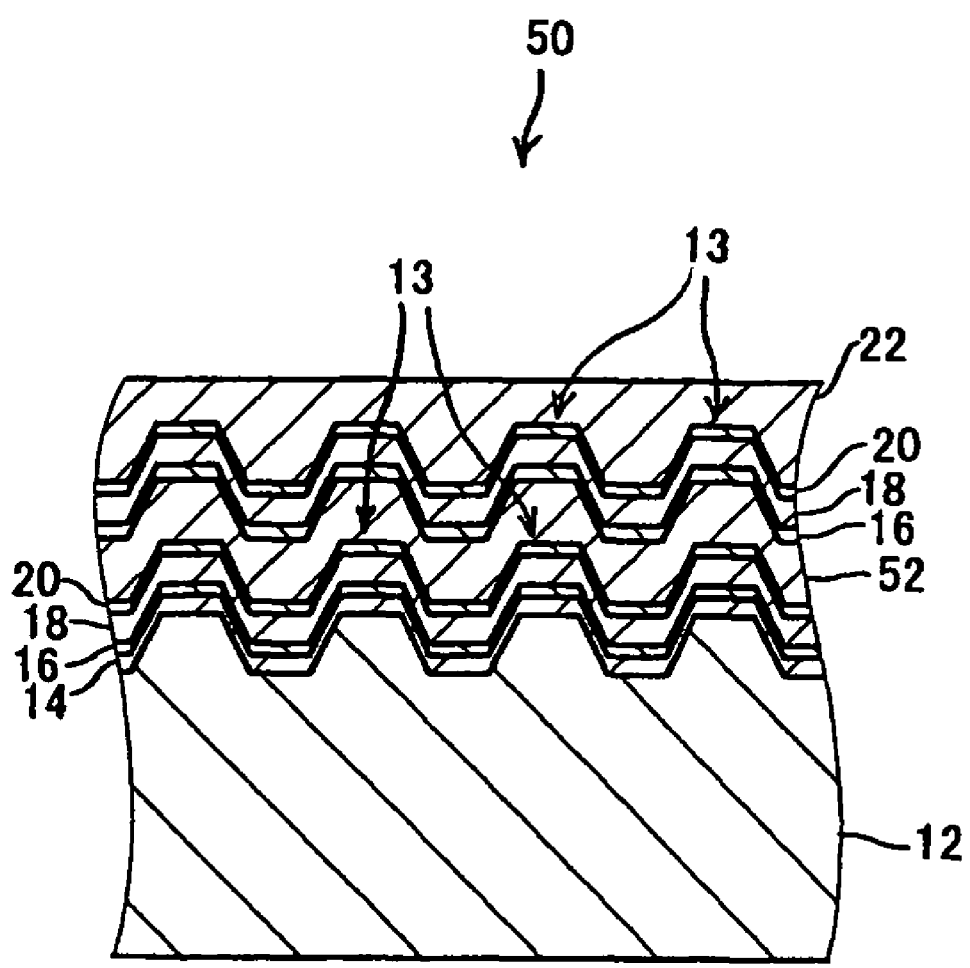
FIG. 7 is a sectional side view schematically showing the configuration of the optical recording medium according to a second exemplary embodiment of the present invention.

As shown in FIG. 7, an optical recording medium 50 according to this second exemplary embodiment comprises a transparent spacer layer 52, and is characterized in that two recording layers 18 are formed with the spacer layer 52 therebetween. Note that no reflecting layer 14 is formed on the spacer layer 52. The rest of the configuration is the same as that of the optical recording medium 10 according to the foregoing first exemplary embodiment. The same reference numerals as in FIG. 1 will thus be given, and description thereof will be omitted. Depending on the type of the optical recording medium, the two recording layers 18 may be provided with tracks 13 of an identical concavo-convex pattern or different concavo-convex patterns.

The spacer layer 52 has a thickness of approximately 25 µm. The spacer layer 52 may be made chiefly of energy ray curable transparent resin such as UV curable acrylic resin and UV curable epoxy resin.

The optical recording medium 50 is capable of recording information on the two recording layers 18, and thus has an accordingly higher recording capacity. In the optical recording medium 50, the recording layers 18 are substantially made of Bi and O, and have a high light transmittance of 70% or above. The recording layers 18 are configured so that recording marks 24 are made of a plurality of cavities 26. This can lower the reflectance (to be detected by the photodetector for reproduction) of the areas of the recording marks 24 while hardly changing the transmittance for blue or blue violet laser light. Consequently, it is possible to irradiate the lower recording layer 18 (the one closer to the substrate 12) with blue or blue violet laser light of constant intensity irrespective of the presence or absence of data recorded on the upper recording layer 18 (the one closer to the cover layer 22). Data can thus be recorded on the lower recording layer 18 with high accuracy. In addition, the data recorded on the lower recording layer 18 can be reproduced with high accuracy.

Here, an example of the method of manufacturing the optical recording medium 50 will be described briefly. Initially, a reflecting layer 14, a dielectric layer 16, a recording layer 18, and a dielectric layer 20 are formed over the substrate 12 in the same manner as in the foregoing first exemplary embodiment. Next, the material of the spacer layer 52 is applied onto the dielectric layer 20. A transparent stamper is put into contact with the material so that the surface of the spacer layer 52 opposite from the substrate 12 is formed into the concavo-convex pattern of tracks 13 and spacer layer 52 has a thickness of 25 µm. The material is then irradiated with the energy rays through the transparent stamper, whereby the spacer layer 52 is cured. Then, the transparent stamper is released. Moreover, a dielectric layer 16, a recording layer 18, a dielectric layer 20, and a cover layer 22 are formed on the spacer layer 52 in the same manner as in the first exemplary embodiment. As a result, the optical recording medium 50 is obtained.

In the foregoing first and second exemplary embodiments, the recording layer(s) 18 is/are substantially made of Bi and O. The ratio of the number of atoms of O to the total number of atoms of Bi and O falls within the range of 63% and 73%. Nevertheless, in the cases where the difference between the light transmittances of the recording marks 24 and the space areas having no recording mark do not matter, the number of atoms of O may be increased beyond the ratio of 73% with respect to the total number of atoms of Bi and O. An example of such cases is that only a single recording layer 18 is formed as in the foregoing first exemplary embodiment.

The recording layer(s) 18 may be made of Bi, O, and M (M is at least one type of element other than Bi and O). Here, the ratio of the number of atoms of Bi to the total number of atoms of Bi and M shall be 50% or higher. The ratios among the numbers of atoms of Bi, O, and M shall satisfy the following expression (I):

$$\{[O-(M\times\alpha/2)]/[Bi+O-(M\times\alpha/2)]\}\times 100 \geqq 63, \ldots \quad (I)$$

where $\alpha$ is the valence of M.

The ratios among the numbers of atoms of Bi, O, and M preferably satisfy the following expression (II):

$$\{[O-(M\times\alpha/2)]/[Bi+O-(M\times\alpha/2)]\}\times 100 \leqq 73, \ldots \quad (I)$$

Now, brief description will be given of the expressions (I) and (II). Since O is bivalent, it is considered that $(M\times\alpha/2)$ atoms of O are chemically combined with M. In the portion of a recording layer excluding M oxides, the number of atoms of O is $[O-(M\times\alpha/2)]$, and the total number of atoms of Bi and O is $[Bi+O-(M\times\alpha/2)]$. Thus, when the ratios among the numbers of atoms of Bi, O, and M are confined to the range given by the foregoing expressions (I) and (II), the portion of the recording layer 18 excluding M oxides provides the same operation as that of the recording layer(s) 18 in the foregoing first and second exemplary embodiments.

For example, the element M may preferably be at least one type of element out of Mg, Al, Si, Ti, Cr, Mn, Fe, Co, Ni, Cu, Zn, Ge, Pd, Ag, Sb, Te, Se, and Ce. Bi has a relatively low melting point of approximately 271° C. When a pure Bi target is used to deposit the recording layer by sputtering, the deposition power must be suppressed with an increase in the deposition time by that much. In contrast, the elements mentioned above can be added to raise the melting point, so that the recording layer can be deposited quickly with higher deposition power.

Incidentally, when the recording layer 18 is made of a material containing Bi, O, and M, the ratio of the number of atoms of Bi to the total number of atoms of Bi and M preferably reaches or exceeds 50%. The number of atoms of Bi reaching or exceeding 70% in ratio is still preferable.

In the foregoing first and second exemplary embodiments, the recording layer(s) 18 is/are substantially made of Bi and O. Other materials may be used for the recording layer(s) 18, however, as long as recording marks containing a plurality of cavities can be formed by irradiation of laser light.

In the foregoing first and second exemplary embodiments, the recording layer(s) 18 is/are configured so that cavities 26 lying in the areas of the center and their vicinities of the recording marks 24, out of the plurality of cavities 26, include cavities 26 greater than ones lying around the areas. Nevertheless, the cavities 26 formed in the areas of the centers and their vicinities of the recording marks 24 may have the same sizes as those of the cavities 26 formed around the areas, or even smaller sizes than those of the cavities 26 around the areas, as long as the recording marks 24 and the peripheral space areas can be distinguished with reliability.

In the foregoing first and second exemplary embodiments, the recording layer(s) 18 is/are formed so that the cavities 26 lying in the peripheral areas are spaced narrower than the cavities 26 lying in the areas of the centers and their vicinities of the recording marks 24 are. Nevertheless, the cavities 26 lying in the areas of the centers and their vicinities of the recording marks 24 may be spaced at the same intervals as the cavities 26 in the peripheral areas are, as long as the recording marks 24 and the peripheral space areas can be distinguished with reliability. The cavities 26 in the peripheral areas may be spaced even wider than the cavities 26 lying in the areas of the centers and their vicinities.

In the foregoing first and second exemplary embodiments, the recording layer(s) 18 is/are configured so that the cavities 26 are formed as enclosed in the recording layer(s) 18. Nevertheless, some or all of the cavities 26 may be exposed to the interface(s) of the recording layer(s) 18 as long as favorable recording and reproducing characteristics can be obtained.

In the foregoing first and second exemplary embodiments, the reflecting layer 14 is formed on the substrate 12. The reflecting layer may be omitted, however, when the recording marks 24 and the space areas provide sufficient amounts of differences in optical characteristics such as reflectance.

In the foregoing first and second exemplary embodiments, the dielectric layers 16 and 20 are formed on both sides of the recording layers 18. However, a dielectric layer may be formed on one side of a recording layer 18 alone. In this case, it is possible to suppress external moisture from reaching the recording layer 18 if the dielectric layer is formed on the side of the recording layer 18 closer to the cover layer 22. On the other hand, when the dielectric layer is formed on the side of the recording layer 18 closer to the substrate 12, it is possible to suppress moisture contained in the substrate 12 and external moisture penetrating the substrate 12 from reaching the recording layer. When a plurality of recording layers are formed with a spacer layer therebetween as in the foregoing second exemplary embodiment, dielectric layers are preferably formed on the cover-layer side (light-incident side) of a recording layer that is the closest to the cover layer and on the substrate-side of a recording layer that is the closest to the substrate. This can suppress moisture from reaching the recording layers from either of the cover-layer side and the substrate side. Moreover, when deformations occurring near the recording marks 24 are sufficiently small, the dielectric layers may be omitted.

In the foregoing second exemplary embodiment, the optical recording medium 50 is of double layer recording type, having the two recording layers 18 with the spacer layer 52 therebetween. Nevertheless, the present invention is also applicable to an optical recording medium of multilayer recording type, in which two or more spacer layers and three or more recording layers are formed alternately.

In the foregoing first and second exemplary embodiments, the optical recording media 10 and 50 are of single-sided recording type, being capable of recording information on one side alone. It is understood, however, that the present invention is also applicable to an optical recording medium of double-sided recording type having recording layers on both sides.

In the foregoing first and second exemplary embodiments, the optical recording media 10 and 50 have tracks 13 that are formed as convex grooves as viewed from the side of the cover layer 22. It is understood, however, that the present invention is also applicable to an optical recording medium of groove type in which the tracks are made of concave grooves as viewed from the side of the cover layer 22. It is also understood that the present invention is applicable to an optical recording medium of land and groove recording type in which both land and groove portions make tracks.

In the foregoing first and second exemplary embodiments, the optical recording media 10 and 50 are configured so that the cover layer 22 is thinner than the substrate 12. It is understood, however, that the present invention is also applicable to an optical recording medium having a substrate and a cover layer of equal thicknesses like DVD.

EXAMPLES

A plurality of optical recording media were made by the same technique as in the foregoing first exemplary embodiment. These optical recording media were configured such that the reflecting layer 14 was omitted from the optical recording medium 10 according to the foregoing first exemplary embodiment. The rest of the configuration was the same as that of the optical recording medium 10. In the step of forming the recording layers of these optical recording media, respective different sputtering conditions were set as shown in Table 1, whereby six types of optical recording media were made with recording layers containing Bi and O in different ratios.

The manufacturing method will now be described in detail. Initially, a plurality of substrates 12 were made of polycarbonate resin by injection molding. Each of the substrates 12 had a thickness of 1.1 mm and a diameter of 120 mm. Convex grooves having a height of 20 nm were formed on the surfaces as tracks 13 at track pitches of 0.32 μm.

Next, these substrates 12 were placed in a sputtering system, and dielectric layers 16 were initially formed to a thickness of 10 nm. Here, the dielectric layers 16 were made of $A_2O_3$.

Then, these substrates 12 were placed in a sputtering system one by one, on which a recording layer 18 was formed to a thickness of 15 nm. Here, as shown in Table 1, the deposition power of the Bi target and the flow rates of the Ar gas and $O_2$ gas were adjust control the ratio of Bi and O in the recording layers 18.

TABLE 1

|    | Gas flow rate (sccm) | | Composition (at %) | | (dB) | Before recording | | Before recording - after recording | | Absorptances at respective wavelengths | | |
| --- | --- | --- | --- | --- | --- | --- | --- | --- | --- | --- | --- | --- |
| Pw | Ar | O2 | Bi | O2 | 8TC/N | Transmittance | Absorptance | ΔT | ΔA | 405 nm | 650 nm | 780 nm |
| 10 | 50 | 50 | 23 | 77 | 52.8 | 85.2% | 10.1% | 2.6% | −2.0% | 10.1% | 0.0% | 0.0% |
| 10 | 50 | 25 | 27 | 73 | 53.6 | 83.1% | 8.9% | 2.1% | −1.4% | 8.9% | 0.0% | 0.0% |
| 10 | 50 | 15 | 30 | 70 | 56.1 | 76.9% | 13.4% | 1.5% | −1.0% | 13.4% | 4.6% | 3.7% |
| 10 | 50 | 13 | 32 | 68 | 57.2 | 76.0% | 13.6% | 0.0% | 1.2% | 13.6% | 4.9% | 3.8% |
| 10 | 50 | 12 | 34 | 66 | 56.3 | 78.1% | 14.3% | −0.6% | 0.9% | 14.3% | 3.7% | 2.1% |
| 8 | 50 | 10 | 37 | 63 | 52.6 | 70.6% | 21.6% | −1.6% | 1.6% | 22.6% | 13.5% | 9.3% |
| 4 | 50 | 8 | 40 | 60 | 33.8 | 58.4% | 33.5% | −2.9% | 3.2% | 33.5% | 25.0% | 21.1% |

Next, dielectric layers 20 were formed on the recording layers 18 to a thickness of 20 nm by sputtering. Like the dielectric layers 16, the dielectric layers 20 were also made of $Al_2O_3$.

Finally, UV curable acryl resin was applied onto the dielectric layers 20 and spread to a thickness of 100 μm by spin coating, before irradiated with ultraviolet rays for curing.

The six types of optical recording media obtained thus were measured for reflectance and absorptance, followed by calculation of light transmittances.

Next, the six types of optical recording media were placed in an optical recording medium evaluation system DDU 1000

(from Pulstec Industrial Co., Ltd.) one by one. The recording power Pw of the laser light was increased gradually from 3 mW to 10 mW to form recording marks having lengths of 2 T and 8 T on the recording layer for data recording. The rest of the conditions were set as follows:

Laser light wavelength: 405 nm,

Numerical aperture NA of the objective lens: 0.85,

Modulation mode: (1, 7) RLL,

Linear recording speed: 5.3 m/sec,

Channel bit length: 0.12 μm,

Channel clock: 66 MHz,

Recording method: on-groove recording,

Reproduction power: 0.7 mW,

Intermediate power: 2.0 mW, and

Base power: 1.0 mW.

For the purpose of observation, a substrate of land and groove type was also prepared, and recorded for every other track. The recording marks 24 were observed in TEM photographs, and it was found that a plurality of cavities 26 were formed in each single recording mark 24 as shown in FIG. 2 seen above. Specifically, in a plan view taken in the direction of irradiation of the laser light, the recording marks 24 contained circular, elliptic, and other shaped cavities, which were counted as the cavities 26. In an energy dispersive spectroscopy (EDS) X-ray analyzer, an element analysis was conducted to make comparison between the cavities 26 and the internal areas of the recording marks 24 other than the cavities 26. It was found that the cavities 26 showed Bi peak strengths weaker than the other areas did. It is thus concluded that the cavities 26 are made of oxygen or are near vacuum. The total areas of the plurality of cavities 26 in the respective recording marks 24 were 38% to 47% (i.e., within the range of 20% and 90%) with respect to the areas of the respective recording marks 24. To be more specific, the areas of the cavities 26 were calculated from the data on photographs of the recording layers taken under a transmission electron microscope (TEM). The data was processed by using an image processing application Scion Image (Beta 4.02) from Scion Corporation, whereby the boundaries of the cavities 26 in the recording marks 24 were identified based on the color contrast between the cavities 26 and the other portions. Among the plurality of cavities 26, the cavities 26 lying in an areas of the centers and their vicinities of the recording marks 24 included cavities 26 greater than those lying around the areas. Moreover, the cavities 26 lying in the peripheral areas were spaced narrower than the cavities 26 lying in the areas of the centers and their vicinities of the recording marks 24 were.

As shown in FIG. 3 seen above, the cavities 26 were also formed as enclosed in the recording layer 18. As shown in FIGS. 3 and 4, the peripheral areas of the recording marks 24 were deformed to protrude toward the substrate 12 in the direction of thickness. Little deformation toward the cover layer 22 was observed. The six types of optical recording media having the recording marks 24 formed thus were measured for reflectance and absorptance, followed by calculation of light transmittances.

Next, by using the optical recording medium evaluation system mentioned above, the optical recording media were irradiated with laser beams one by one under the following conditions, whereby the 8 T-length recording marks 24 recorded on the recording layers were reproduced. The reproduced signals were measured for the modulation factor and the C/N (carrier-to-noise) ratio. The C/N ratio was measured by using a spectrum analyzer XK180 (from Advantest Corporation). The reproducing conditions were set as follows:

Laser light wavelength: 405 nm,

Reproduction power Pr: 0.7 mW, and

Numerical aperture NA of the objective lens: 0.85.

Figure 8:
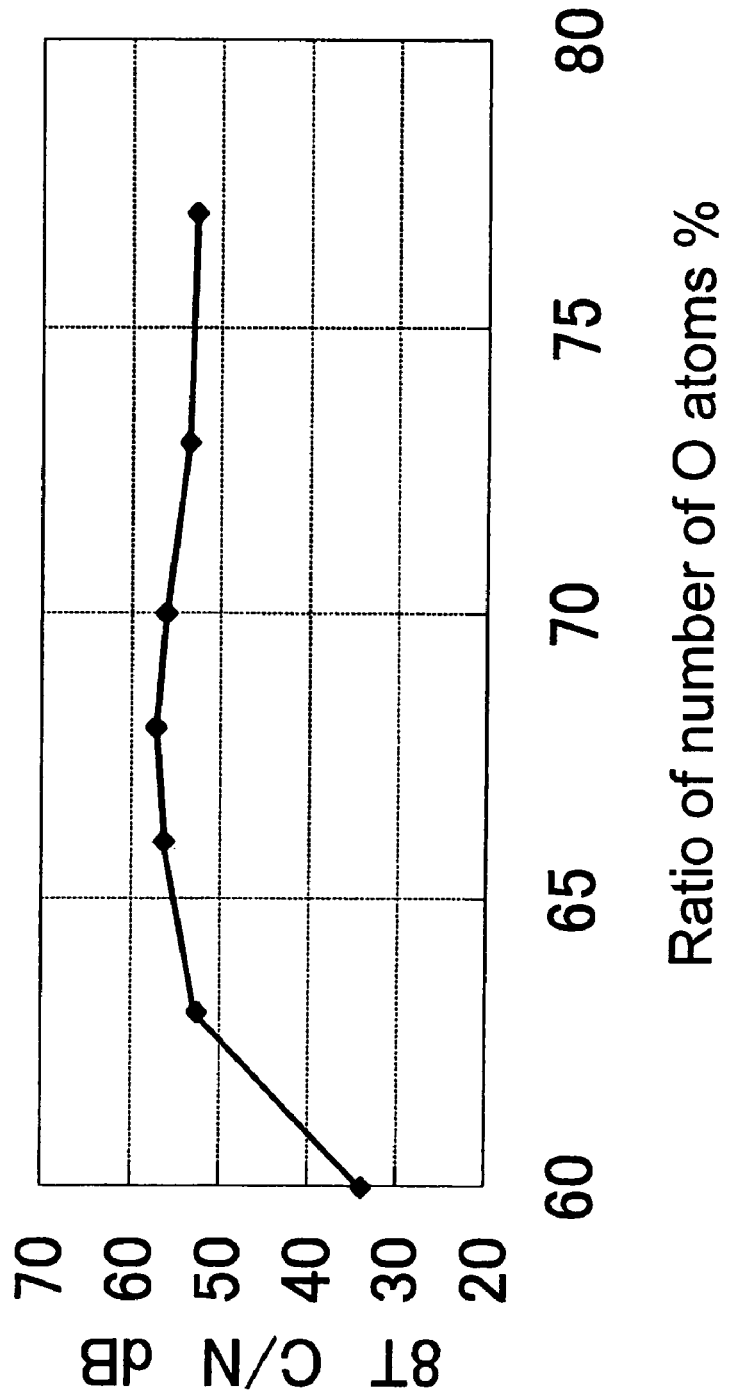
FIG. 8 is a graph showing the relationship between the ratio of the number of atoms of O to the total number of atoms of Bi and O and the C/N ratio of a signal reproduced from the 8 T recording marks in experimental examples.

FIG. 8 is a graph showing the relationship between the ratio of the number of atoms of O to the total number of atoms of Bi and O and the C/N ratio of the signal reproduced from 8 T-length recording marks. As shown in FIG. 8, when the number of atoms of O is at a ratio of 60%, the C/N ratio is below 35 dB. Here, the recorded data is hard to reproduce with reliability. If the number of atoms of O reaches or exceeds a ratio of 63%, the C/N ratio increases significantly to or above 50 dB. In this case, the recorded data can be reproduced favorably. Incidentally, after approximately 50 hours of storage in a high-temperature high-humidity environment of 80° C. in temperature and 85% in humidity, the reproduction signals of the recording marks were measured for the C/N ratio again. Little change was observed. This confirms excellent data retention characteristics.

Figure 9:
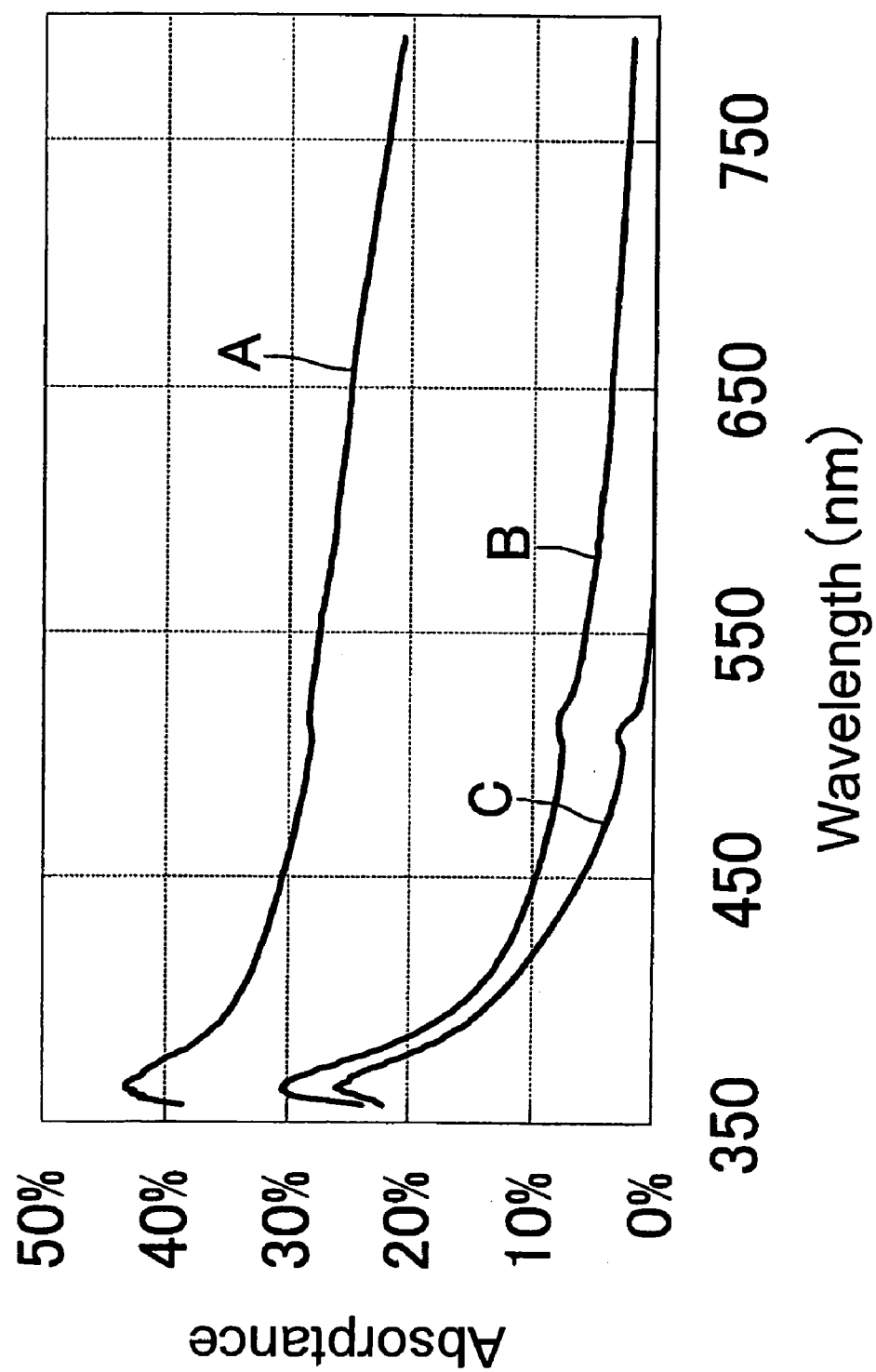
FIG. 9 is a graph showing the relationship between the wavelength and absorptance of irradiation light in the experimental examples.

Moreover, three types of optical recording media, 60%, 66%, and 77% in the ratio of the number of atoms of O to the total number of atoms of Bi and O, were measured for the relationship between the wavelength and absorptance of the irradiation light. FIG. 9 shows the results. In FIG. 9, the curve designated by the reference symbol A shows the measurements on the optical recording medium of 60% in the ratio of the number of atoms of O. The curve designated by the reference symbol B shows the measurements on the optical recording medium of 66% in the ratio of the number of atoms of O. The curve designated by the reference symbol C shows the measurements on the optical recording medium of 77% in the ratio of the number of atoms of O. For the sake of proper operation, a recording layer must have an absorptance of at least 5% or higher. At or above an absorptance of 8%, it is possible to form recording marks with reliability. Consequently, the optical recording medium of 77% in the ratio of the number of atoms of O must be irradiated with laser light having a wavelength of 450 nm or shorter, and preferably with laser light of 420 nm or shorter. The optical recording medium of 66% in the ratio of the number of atoms of O must be irradiated with laser light having a wavelength of 550 nm or shorter, and preferably with laser light of 500 nm or shorter. The optical recording medium of 60% in the ratio of the number of atoms of O exhibits high absorptances of 20% and above across all the wavelengths of the irradiation light. Nevertheless, this recording layer is not actually available since it can only provide insufficient C/N ratios when the laser light having a wavelength of 405 nm is used as described above.

In short, the optical recording medium of 77% in the ratio of the number of atoms of O is suitably used when laser light having a wavelength of 450 nm or shorter is used as the irradiation light. The optical recording medium of 66% in the ratio of the number of atoms of O is suitably used when laser light having a wavelength of 550 nm or shorter is used as the irradiation light.

Figure 10:
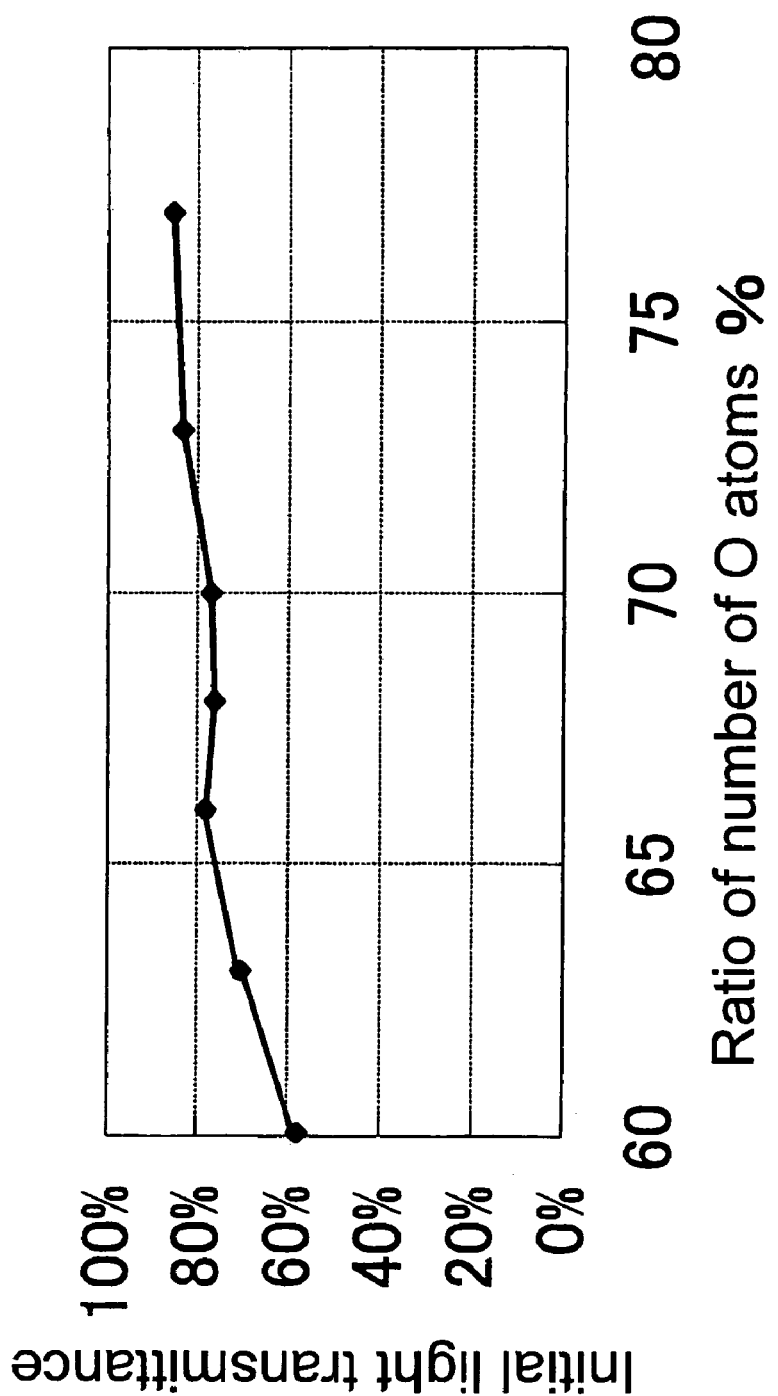
FIG. 10 is a graph showing the relationship between the ratio of the number of atoms of O to the total number of atoms of Bi and O and the light transmittance before formation of recording marks in the experimental examples.
Figure 11:
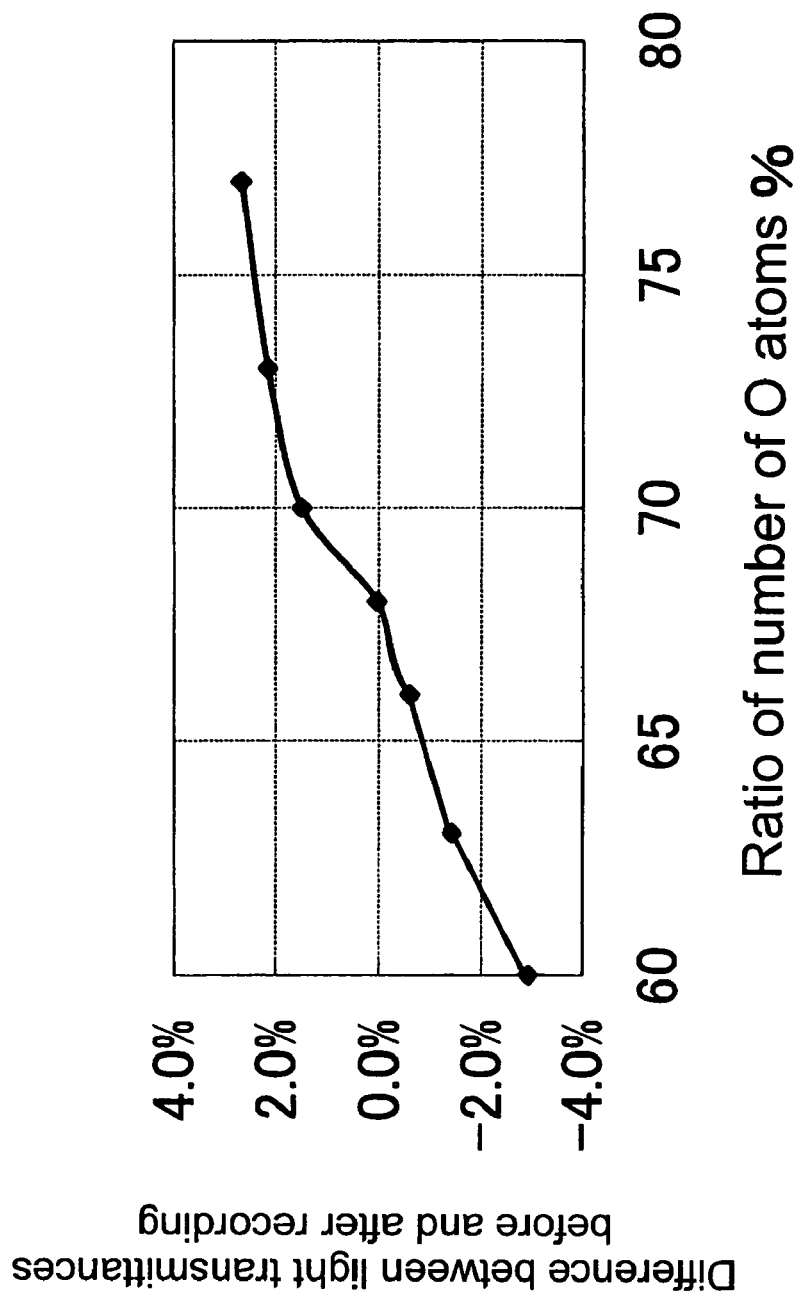
FIG. 11 is a graph showing the relationship between the ratio of the number of atoms of O to the total number of atoms of Bi and O and the difference between the light transmittances before and after the formation of the recording marks in the experimental examples.

FIG. 10 is a graph showing the relationship between the ratio of the number of atoms of O to the total number of atoms of Bi and O and the light transmittance before formation of recording marks. FIG. 11 is a graph showing the relationship between the ratio of the number of atoms of O to the total number of atoms of Bi and O and the difference between the light transmittances before and after the formation of recording marks. As shown in FIG. 10, the recording layer of the optical recording medium of 60% in the ratio of the number of atoms of O has a light transmittance of around 60%. In contrast, all the recording layers of the six types of optical recording media, which reach or exceed 63% in the ratio of the number of atoms of O, have high light transmittances of above 70%. Besides, all the recording layers of the five types of optical recording media that reach or exceed 66% in the ratio of the number of atoms of O have high light transmittances of around 80%. In the recording layers falling within the range of 63% to 73% in the ratio of the number of atoms of O, the difference between the light transmittances before and after the formation of recording marks is suppressed to around 2%. It is thus found that the recording layers of the optical recording media falling within the range of 63% to 73% in the ratio of the number of atoms of O are suitable for the recording layers of optical recording media of multilayer recording type, having three or four layers, for example.

Here, brief description will be given of the method of measuring the light transmittance. In specific terms, an optical thickness measuring system ETA-RT (from Steag ETA-OPTIK GmbH) is used to irradiate a recording layer with laser light and measure it for absorptance (including both absorptance and diffusion). The light transmittance is calculated from this absorptance. In view of the effect of surface reflection, the value of the light transmittance is determined excluding that effect. More specifically, the light transmittance is calculated by the following equation:

light transmittance=100−reflectance−absorptance (including diffusion and refraction)

Here, the reflectance is measured by using the optical recording medium evaluation system DDU 1000 mentioned above.

Next, description will be given of the method of measuring the recording layers for the ratio of the numbers of atoms of Bi and O inside. The ratio of the numbers of atoms of Bi and O in the recording layers of the optical recording media were measured by using samples that were made for composition analysis. Specifically, a plurality of Si substrates having a thickness of 0.5 mm were prepared. These Si substrates were placed in a sputtering system one by one. Recording layers were formed on the respective Si substrates to a thickness of 200 nm while the deposition power of the Bi target and the flow rates of the Ar gas and $O_2$ gas were adjusted to the conditions shown in Table 1 as in fabricating the plurality of optical recording media described above.

Next, an X-ray fluorescence analysis system RIX2000 (from Rigaku Corporation) was used to measure the recording layers for Bi and O contents by a fundamental parameter (FP) method. For the Bi measurement, X-rays were generated by setting the tube voltage of the Rh tube at 40 kV and the tube current at 30 mA. For the O measurement, X-rays were generated by setting the tube voltage of the Rh tube at 30 kV and the tube current at 120 mA. Here, Al was used as the primary X-ray filter. The characteristic X-rays for Bi were Bi-L α rays, and the characteristic X-rays for O were O—K α-rays. The FP method requires system sensitivity correction coefficients. For Bi, Bi bulk was used as a reference sample. For O, a sample made by briquetting was prepared. Here, an Al ring having an inner diameter of 30 mm, a height of 4 mm, and a thickness of 2 mm was used as a protective ring. Powder $Bi_2O_3$ (from Japan Pure Chemical Co., Ltd.) was placed in this ring, and pressed under 147000 N or so to make a briquette of approximately 2 mm. The system sensitivity correction coefficients were 1.20270 for Bi, and 0.299447 for O.

What is claimed is:

1. An optical recording medium comprising:

a substrate; and a recording layer in which a recording mark composed of a plurality of cavities is formed by irradiation of laser light, the recording layer being formed on the substrate, wherein the recording layer is configured so that, in a plan view taken in a direction of irradiation of the laser light, cavities lying in an area of a center and vicinity of the center of each recording mark include cavities whose size is greater than that of cavities lying around the area of the center and the vicinity of the center of the recording mark, cavities lying in a peripheral area of the recording mark are spaced narrower than the cavities lying in the area of the center and the vicinity of the center of the recording mark, and each cavity is filled with gas or is substantially a vacuum.

2. The optical recording medium according to claim 1, wherein the recording layer is configured so that it is deformed to protrude toward the substrate in a direction of thickness and the substrate is also deformed when the recording mark is formed.

3. The optical recording medium according to claim 1, wherein the recording layer is configured so that the cavities are formed as enclosed in the recording layer.

4. The optical recording medium according to claim 1, wherein tracks for forming the recording mark are formed at track pitches within a range of 0.1 to 0.5 μm.

5. The optical recording medium according to claim 1, further comprising a spacer layer, and wherein a plurality of the recording layers are formed on one side of the substrate with the spacer layer therebetween.

6. A method of recording and reproducing of an optical recording medium, comprising:

a recording step of irradiating an optical recording medium with laser light for recording so that a recording mark composed of a plurality of cavities is formed in a recording layer of the optical recording medium; and a reproducing step of irradiating the optical recording medium with laser light for reproduction so that information is reproduced based on a difference between a reflectance of an area of the recording mark and a reflectance of a space area around the recording mark, wherein, in the recording step, each recording mark is formed so that, in a plan view taken in a direction of irradiation of the laser light, cavities lying in an area of a center and vicinity of the center of the recording mark include cavities whose size is greater than that of cavities lying around the area of the center and the vicinity of the center of the recording mark, cavities lying in a peripheral area of the recording mark are spaced narrower than the cavities lying in the area of the center and the vicinity of the center of the recording mark, and each cavity is filled with gas or is substantially a vacuum.

7. The method of recording and reproducing of an optical recording medium according to claim 6, wherein
in the recording step, each recording mark is formed so that, in the plan view taken in the direction of irradiation of the laser light, a total area of the plurality of cavities in the recording mark falls within a range of 20% to 90% with respect to an area of the recording mark.

8. The method of recording and reproducing of an optical recording medium according to claim 6, wherein
in the recording step, the recording mark is formed in a part of the recording layer while the part is deformed to protrude toward the substrate in a direction of thickness and the substrate is also deformed.

9. The optical recording medium according to claim 1, wherein the peripheral area completely surrounds the area of the center and the vicinity of the center of the recording mark.

10. The method of recording and reproducing of an optical recording medium according to claim 6, wherein the peripheral area completely surrounds the area of the center and the vicinity of the center of the recording mark.

* * * * *